US006791552B2

(12) United States Patent
Gould et al.

(10) Patent No.: US 6,791,552 B2
(45) Date of Patent: *Sep. 14, 2004

(54) DIGITAL VIDEO PROCESSING

(75) Inventors: Antony James Gould, Basingstoke (GB); Jonathan James Stone, Reading (GB)

(73) Assignee: Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,534

(22) Filed: Jul. 28, 1999

(65) Prior Publication Data

US 2003/0085899 A1 May 8, 2003

(30) Foreign Application Priority Data

Jul. 31, 1998 (GB) .............................................. 9816772

(51) Int. Cl.[7] ................................................ G06T 1/20

(52) U.S. Cl. ........................ 345/506; 345/557; 345/473; 345/726

(58) Field of Search ................................. 345/419, 503, 345/505, 545, 547, 557, 506, 473, 726

(56) References Cited

U.S. PATENT DOCUMENTS

| 4,991,019 A |   | 2/1991  | Enami et al. |         |
|-------------|---|---------|--------------|---------|
| 5,490,246 A | * | 2/1996  | Brotsky et al. | 345/763 |
| 5,970,496 A | * | 10/1999 | Katzenberger | 707/102 |

(List continued on next page.)

FOREIGN PATENT DOCUMENTS

| EP | 0 225 166   | 6/1987  |
| EP | 0 473 414   | 3/1992  |
| EP | 0 661 885   | 7/1995  |
| GB | 2 247 597   | 3/1992  |
| GB | 2 254 518   | 10/1992 |
| GB | 2 262 365   | 6/1993  |
| WO | WO 97/47128 | 12/1997 |

OTHER PUBLICATIONS

Stonebraker H et al: "Tioga: providing data management support for scientific visualization applications" 19TH International Conference on Very Large Data Bases Proceedings, Proceeding of 19TH International Conference on Very Large Data Bases, Dublin, Ireland, Aug. 24–27, 1993, pp. 1–20, XP002252475 1993. Palo Alto, CA, USA, Morgan Kaufmann Publishers, USA.

Lau–Kee D: "Easy Image Processing?" Computer Systems, Techpress Publishing Company Ltd. Bromley, GB, vol. 9, No. 8, Aug. 1, 1989, pp. 33–34, XP000047502.

(List continued on next page.)

Primary Examiner—Ulka J. Chauhan
(74) Attorney, Agent, or Firm—Frommer Lawrence & Haug LLP; William S. Frommer; Bruno Polito

(57) ABSTRACT

Digital video processing apparatus comprising: a plurality of render processors arranged in an operational sequence, each operable to render an output result relating to an image of a video signal from input data relating to that and/or other images received from a preceding render processor in the operational sequence; and a render controller for controlling rendering operation of the render processors; each render processor being operable to communicate dependency data to the render controller, indicating which images must be rendered by a preceding render processor in order for that render processor to render output data relating to a required image; and the render controller being operable to control operation of the render processors so that images required by each render processor are rendered by preceding render processors in the operational sequence.

2 Claims, 10 Drawing Sheets

U.S. PATENT DOCUMENTS

| | | | | |
|---|---|---|---|---|
| 5,986,667 A | * | 11/1999 | Jevans | 345/1.1 |
| 6,014,147 A | * | 1/2000 | Politis et al. | 345/522 |
| 6,084,597 A | * | 7/2000 | Herbstman et al. | 345/630 |
| 6,167,404 A | * | 12/2000 | Morcos et al. | 345/700 |
| 6,215,495 B1 | * | 4/2001 | Grantham et al. | 345/419 |
| 6,262,734 B1 | * | 7/2001 | Ishikawa | 345/440 |
| 6,266,053 B1 | * | 7/2001 | French et al. | 345/440 |
| 6,272,650 B1 | * | 8/2001 | Meyer et al. | 380/227 |
| 6,295,367 B1 | * | 9/2001 | Crabtree et al. | 382/103 |
| 6,326,983 B1 | * | 12/2001 | Venable et al. | 345/589 |

OTHER PUBLICATIONS

Hartenstein R W et al: "A Reconfigurable Machine for Applications in Image and Video Compression" Proceedings of the SPIE, SPIE, Bellingham, VA, US, vol. 2451, Mar. 20, 1995, pp. 9–20, XP000602712.

D. Shen et al "Adaptive Motion Vector Resampling for Compressed Video Down–Scaling", pp. 771–774.

* cited by examiner-

DIGITAL VIDEO PROCESSING

BACKGROUND OF THE INVENTION

1. Field of the Invention

This invention relates to digital video processing.

2. Description of the Prior Art

In digital video processing apparatus such as a video special effects apparatus, input images of an input video sequence are processed to generate output images of an output video sequence. Between the overall input to the system and the overall output from the system (both generally images) there may be other intermediate data types generated, for example motion vectors and position values.

In one example of such an apparatus, the user can set up a composite special effect to be applied to a video sequence by selecting a succession of effects modules from a large number of available modules. For example, a sequence (a "directed acyclic graph") of effects set up by a user might comprise:

(i) image loader
(ii) motion tracker
(iii) lighting effect linked to motion tracking and image loader
(iv) image realignment linked to motion tracking and image loader Once a particular effect has been selected and all the parameters defined, a "rendering" operation has to take place.

Rendering is the process of generating an output image (or series of images forming an output video sequence) according to the processing operation which has been set up. For example, a lighting effect might involve the user selecting a source and a destination position for a computer-generated spotlight to be applied to a video sequence. Once these positions have been defined, the next task is to render each image in the output sequence by applying the defined lighting effect to determine the colour and luminance of each pixel of each output image.

SUMMARY OF THE INVENTION

This invention provides digital video processing apparatus comprising:

a plurality of render processors arranged in a directed acyclic graph, each operable to render an output result relating to an image of a video signal from input data relating to that and/or other images received from a preceding render processor in the directed acyclic graph; and a render controller for controlling rendering operation of the render processors;

each render processor being operable to communicate dependency data to the render controller, indicating which images must be rendered by a preceding render processor in order for that render processor to render output data relating to a required image; and the render controller being operable to control operation of the render processors so that images required by each render processor are rendered by preceding render processors in the directed acyclic graph.

In the invention, each render processor can communicate its dependencies to a render controller, which in turn controls other render processors earlier in the operational sequence or directed acyclic graph to provide the images needed by that render processor.

The above, and other objects, features and advantages of this invention will be apparent from the following detailed description of illustrative embodiments which is to be read in connection with the accompanying drawings.

BRIEF DESCRIPTION OF THE DRAWINGS

FIG. 12 schematically illustrates a previously proposed effects plug-in;

FIG. 13 schematically illustrates a new form of effects plug-in;

DESCRIPTION OF THE PREFERRED EMBODIMENTS

Figure 1:
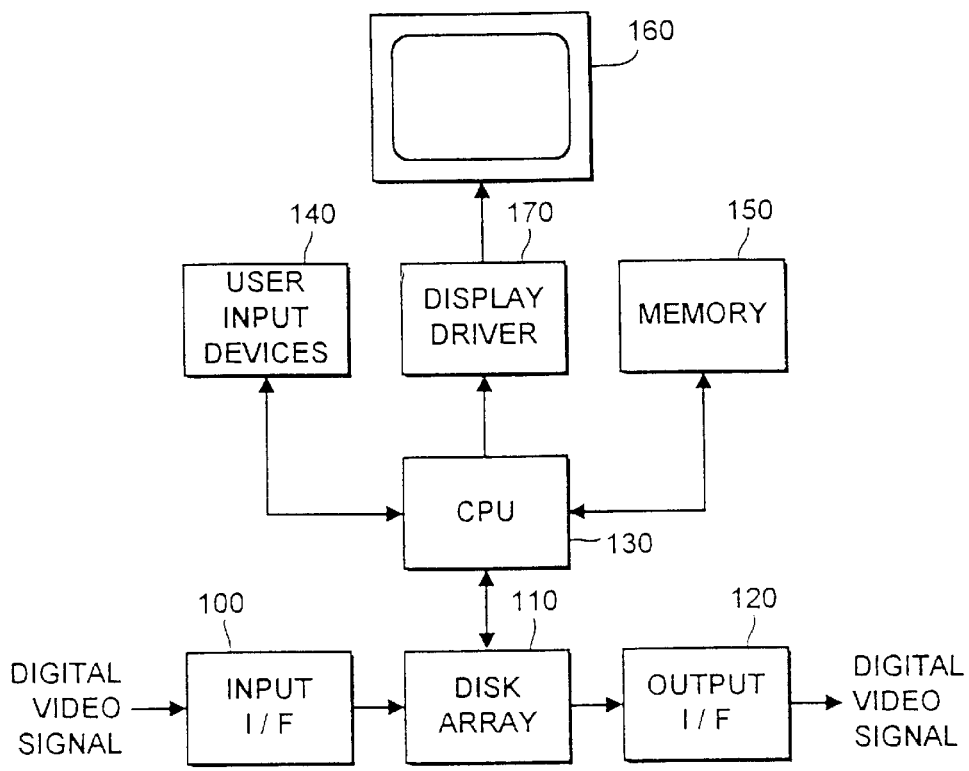
FIG. 1 schematically illustrates a digital video special effects apparatus.

FIG. 1 schematically illustrates a digital video special effects apparatus.

A digital video signal, comprising successive video images, is received via an input interface 100 and stored in a disk array device 110. The disk array device 110 also stores any manipulated images generated by the apparatus, and these can be supplied for output via an output interface 120.

A central processing unit 130 accesses data stored in the disk array to carry out various video special effects in accordance with user commands. The CPU 130 receives input from user input devices 140 such as a mouse and a keyboard, stores working data and programme code in a memory 150, and generates data for output on a display screen 160 via a display driver 170.

The apparatus can be implemented as a general purpose computer (e.g. a PC) running appropriate software, for example under the Microsoft Windows NT® operating system. In the present embodiment, the disk array is connected to the CPU 130 via an UltraSCSI data link.

Figure 2:
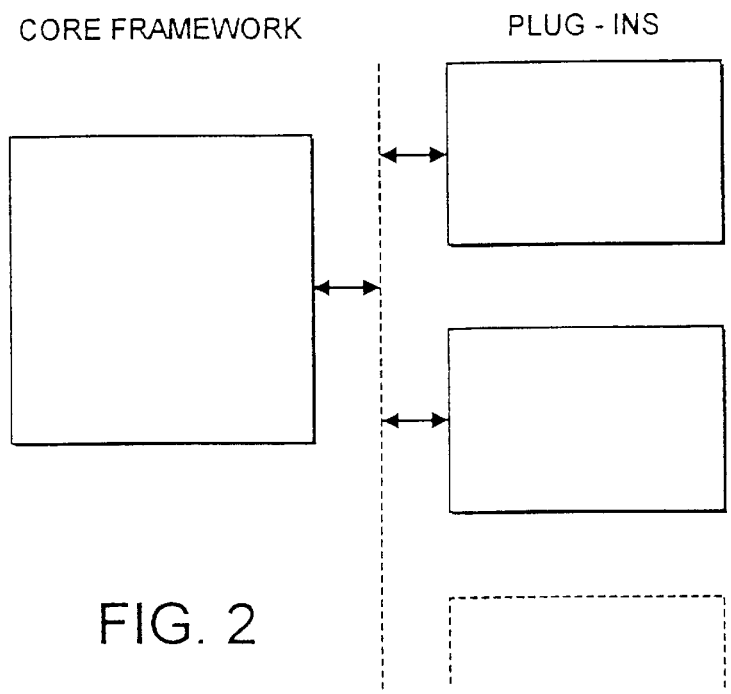
FIG. 2 schematically illustrates the organisation of operating software of the apparatus of FIG. 1.

FIG. 2 schematically illustrates (at a very general level) the organisation of operating software for the apparatus of FIG. 1.

The software is arranged as two categories of programme code: a core framework, shown to the left-hand side of FIG.

2, and various "plug-ins", shown to the right-hand side of FIG. 2. Once the software has been initially loaded, the core framework is always present and controls parts of the operation of the apparatus which are shared between different special effects processes. In contrast, the plug-ins relate to individual special effects (such as a lighting effect, a motion-tracking effect, and so on) and are loaded only when needed.

This is a very efficient arrangement because only those plug-ins relating to effects modules current required by the user need be loaded into memory. This saves memory in comparison with a system in which a programme code for every possible special effect has to be loaded. It also allows for a more rapid initialisation of the apparatus, avoiding the need to load all the program code into memory when the system is first started up, and can reduce any delays through code loading when an icon is first selected in the graph editor (see below). Furthermore, the arrangement allows a reduced subset of the apparatus (in particular, the operating software) to be supplied or installed, containing just a graph editor and the core processing but without the plug-ins, so long as they stick to a defined interface protocol between the plug-ins and the core framework. So, a user could produce a bespoke effect very simply by writing a relatively small plug-in programme.

The core framework and plug-ins communicate with one another using a so-called "object linking and embedding" (OLE) protocol, described in the book "Understanding ActiveX and OLE", David Chappell, Microsoft Press, 1996.

In the OLE system, a software designer can implement different sections of a computer programme as so-called "COM[1] objects". Each COM object supports one or more COM "interfaces", each including a number of "methods". A method is a function or procedure to carry out a specific action. COM methods can be called by software using that COM object. The system is restricted so that other parts of the software using, a COM object can do so only via the defined interfaces—so they cannot directly access programme code or data within the object other than via the defined COM interfaces.

[1] Component Object Model

So, in the present system, the core framework communicates with the plug-ins via these COM interfaces. (In fact, the core framework comprises a number of intercommunicating objects capable of providing a COM interface, but the basic principle in the same).

Figure 3:
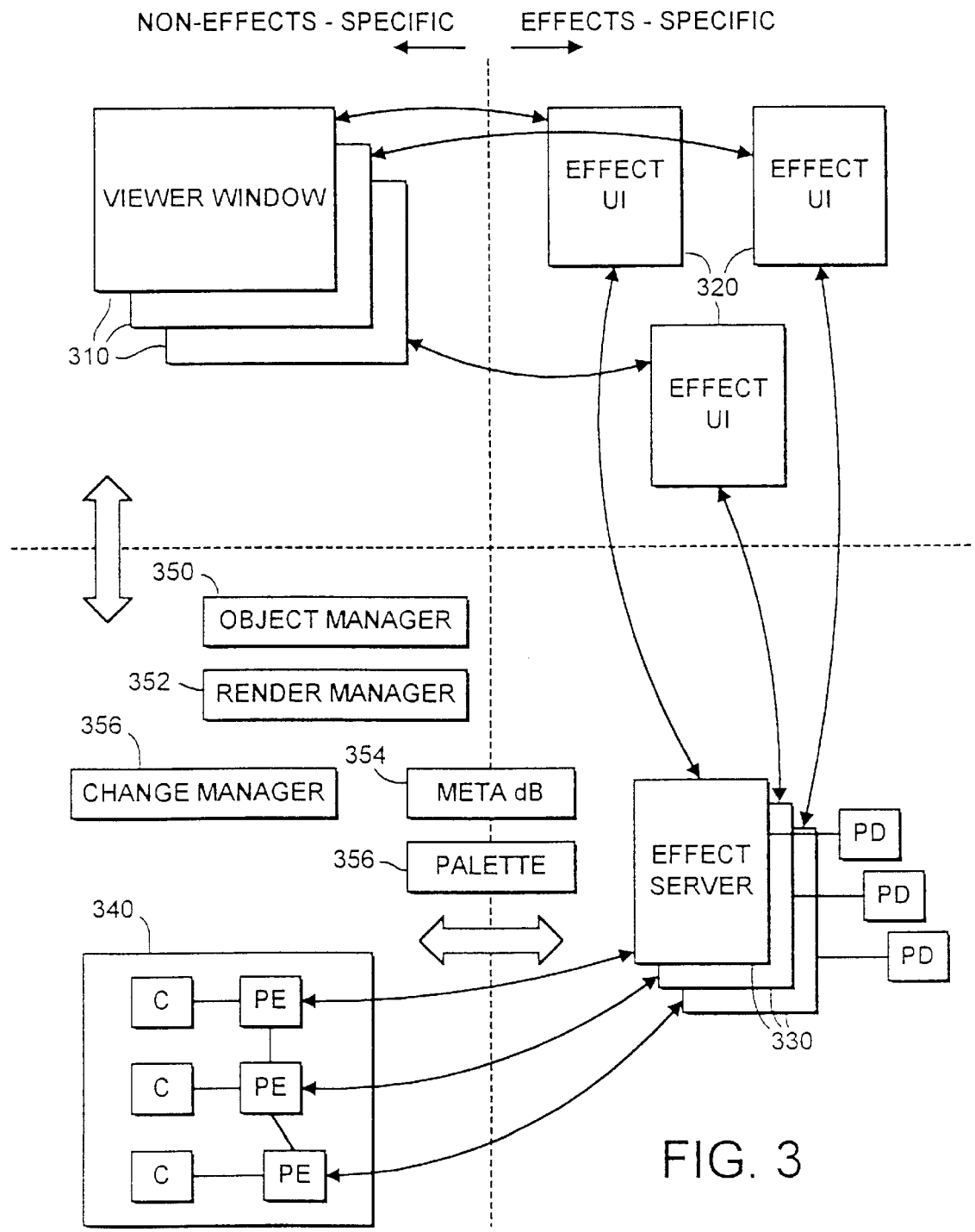
FIG. 3 is a more detailed schematic illustration of the organisation of operating software for the apparatus of FIG. 1.

FIG. 3 illustrates the organisation of the operating software in much greater detail than that shown in FIG. 2. In FIG. 3, the diagram is divided into four quadrants. An upper left quadrant shows so-called viewer windows 310; an upper right quadrant shows effect user interfaces (UI) 320; a lower right quadrant shows effect "servers" 330 having associated parameter data (PD); and a lower left quadrant shows a core processor 340 including a graph, along with an object manager 350, a render manager 352 and a change manager 358. At the interface between the lower left and lower right quadrants is a meta database 354 which forms part of the Windows NT Registry, and a palette 356 containing effects icons, and default parameter values. The meta database 354 will be described further with reference to FIG. 11, and the palette with reference to FIGS. 6 to 9 below.

Within the core processor 340 is a "graph" —in fact a "directed acyclic graph" having a linked series of individual special effects. Each effect is represented in the graph as a proxy effect (PE) having an associated cache (C) for storing the effect's output as soon as it becomes available, thereby allowing re-use of data from effects in a chain of effects if, for example, a parameter associated with an effect higher in the chain is changed. Each proxy effect is associated with a respective effects server 330.

The object manager 350 is responsible for controlling the lifetime and memory management of active objects in the system. The render manager 352 controls the starting, progress, prioritisation and stopping of render tasks. The change manager 358 controls undo/redo information and the notification of changes to various parts of the system.

The basic division of FIG. 3 is that the two left-hand quadrants (upper left and lower left) relate to features of the core framework which are not specific to any particular effect. These objects are loaded into memory regardless of which particular special effects the user wishes to implement. The two right-hand quadrants (upper right and lower right) relate to the plug-ins. Each plug-in has a server 330, which carries out the processing associated with the effect performed by the that plug-in, and a user interface 320 which provides user interface controls (in fact, for display in a viewer window 310) relating to that effect.

There is a similar top-bottom split in FIG. 3, whereby the two upper quadrants (upper left and upper right) relate to user interface controls associated with the special effects, and the two lower quadrants (lower left and lower right) relate to the processing demand organisation carried out to implement those effects.

Viewer windows give the user the opportunity to view the output of and control parameters for a particular effect in a chain of effects built up for execution by the apparatus. So, when a viewer window is opened by the user, the output of an effect must either be generated or, if available, retrieved from a cache store.

In a system of this type employing multiple COM objects, it is generally considered undesirable that each object should save its working or results data in a separate data file. Indeed, such an arrangement would go against much of the reasoning which led to the establishment of the OLE system. Instead, data in this type of system is stored by all of the objects in a single file or "compound document", but with an ordered structure within that compound document.

Basically, inside the compound document, a structure analogous to a file and directory structure is provided. The equivalent of a directory is a so-called "storage", and the analogy of a file is a so-called "stream". Each compound document contains a root storage, below which is a familiar tree structure of storages and streams. The COM stream interface is simpler than the COM storage interface, but of course the storage interface offers more flexibility.

In general, each COM object can be assigned either its own storage or its own stream in which to store its working data. However, in a hierarchical system such as the present video special effects processor, where the core 340 co-ordinates operation of a number of plug-ins, the arrangement used in previous systems is to allocate a stream to each effects plug-in.

In contrast, in the present embodiment it is recognized that simply allocating either a storage or a stream to a plug-in places too many constraints on the design and operation of a plug-in object. Instead, in the interface definition between the core and the plug-ins, each plug-in can select between a stream, so that it can—if desired by the plug-in designer—store its working data in a straightforward manner, and a storage, so that it can—if desired—store its working data under its own "directory" arrangement of streams and storages. This selection is made in advance by the plug-in designer creating the plug-in program code.

In the description which follows, communication protocols between the various objects will be described with relation to FIGS. 4 and 5. The way in which the graph editor part of the core programme 340 is used to set up a chain of individual effects to form a composite effect will be described with relation to FIGS. 6 to 9. The viewer windows and their interaction with the effect UIs 320 will then be described with reference to FIG. 10.

Figure 4:
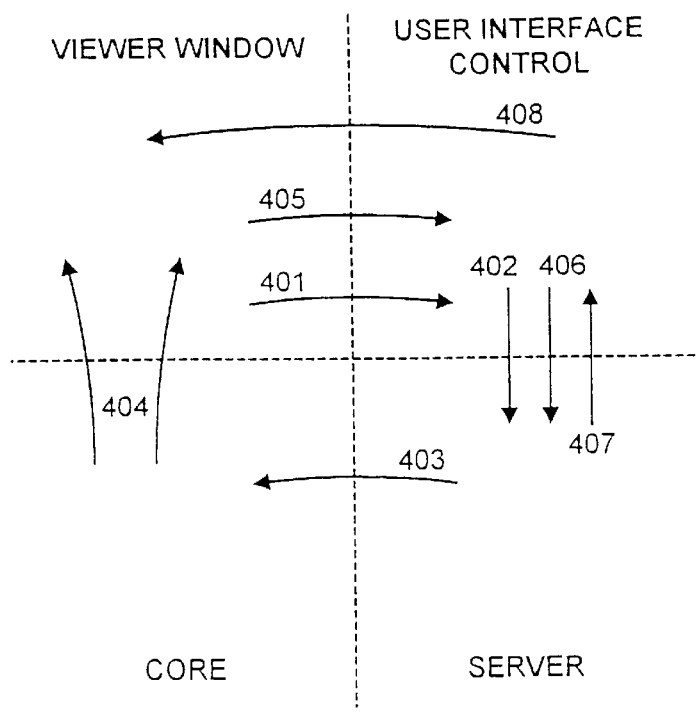
FIG. 4 schematically illustrates the propagation of an updated effects parameter in the apparatus of FIG. 1.
Figure 5:
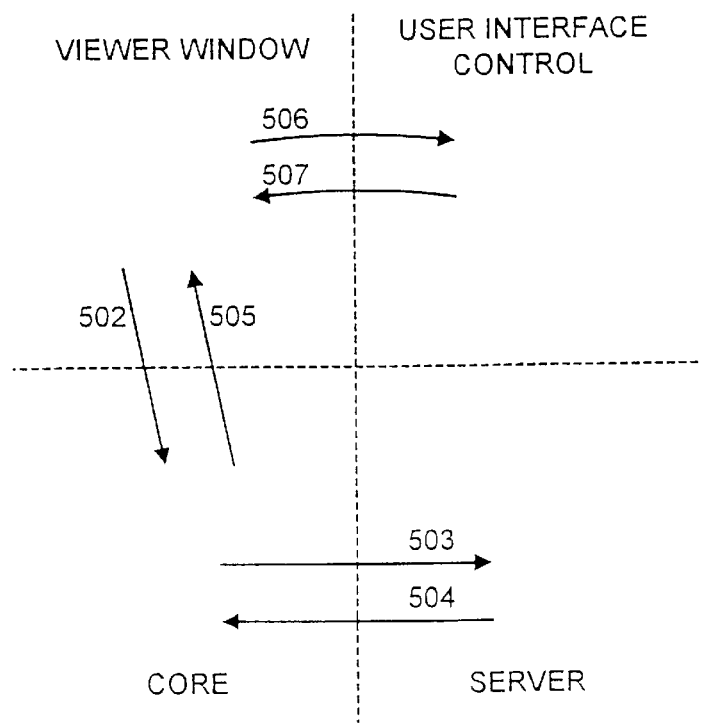
FIG. 5 schematically illustrates the propagation of a re-render command in the apparatus of FIG. 1.

So, FIG. 4 schematically illustrates the propagation of an updated effects parameter in the arrangement of FIG. 3.

An example of this situation is that the user is setting up a "lighting" special effect, in which the effect of a light source is added to an image. The light source has user-definable source and destination position with respect to the image. If the user wishes to change one of these positions, this will invalidate any currently rendered output from that effect and also the change will need to be propagated between the various objects shown in the different quadrants of FIG. 3. This process is shown in FIG. 4.

Referring to FIG. 4, the user usually enters a changed parameter via a viewer window 310 (see FIG. 10 below). The viewer window is associated with a particular effect UI 320, which in turn is part of a plug-in relating to an individual effect. (In fact, a single viewer window can be associated with more than one effect, and not all effects need have viewer windows open at any particular time, but the simplified arrangements of FIG. 3 will be maintained for this discussion). The plug-in issues an "about to edit" notification to the core.

After the change has been made, the plug-in issues a "change occurred" message. This involves and/or initiates a series of actions. As a first step 401, the viewer window communicates the updated parameter to the effect UI 320. The effect UI 320 issues a "set" command to the corresponding effect server 330, setting the revised value in a parameter store within the effect server 330. This is a step 402 on FIG. 4.

In a step 403, the effect server 330 writes a "undo/redo" object into the core 340, providing details of a handle or pointer which points to a record (in the effects server) of the parameter before and after the change. In response to receipt of this undo/redo object, in a step 404 the core broadcasts a notification to all viewer windows that a parameter has changed and that some cached data outputs may be invalidated. This notification is not specific to the viewer window in which the parameter change took place.

At a step 405, each viewer window issues a message to the corresponding effect UI 320 requesting an update of its processing parameters. At a step 406, the effect UI 320 issues a "get" command to the corresponding effect server to get the new parameter, and the new parameter is returned to the effect UI 320 at a step 407. The effect UI then propagates the change for display in the viewer window at a step 408.

Generally, when a processing parameter is changed, this results in the need to re-render the output of one or more effects. FIG. 5 illustrates the way in which a re-render command is propagated through the apparatus, and follows on from the processing of FIG. 4.

At a step 502, the viewer window issues a re-render command to the render manager. The render manager then issues a re-render command to the corresponding effects server 330. When the effects server has finished re-rendering the image, it issues a "finished" message to the core 340. The core communicates this to the viewer window at a step 505, and at a step 506 and 507 the viewer window interacts with the effect UI 320 to display the re-rendered effect out put.

Where there are several viewer windows open, and several frames in a range of interest (which can be defined by the user as a subset—for test purposes—of the overall video clip), images are rendered as multiple concurrent tasks, according to the following priority order for allocating processing resources:

(i) an image or images currently displayed for view by a user;

(ii) first and last images of the output sequence of interest; and (iii) remaining images of the output video sequence of interest.

As a further level of detail, before the render manager issues a re-render command to the effects server, the render manager issues a "prepare to render" message specifying which image in the sequence is to be rendered. The effects server responds with a notification of its "dependencies", i.e. those rendered images which are essential before the request by the render manager can be executed. These might be images rendered by another effect (e.g. the or an immediately preceding effect in the directed acyclic graph) or images rendered by that effect itself. This latter case can occur in the example of a motion tracker, where in order to render, say, image 5, the motion tracker needs its own rendered output for image 4.

In response to the messages received back from the effects server, the render manager sends a "prepare to render" message requesting those images, and so on until the dependency tree has ended.

At each stage, the effect proxy checks whether the required image or rendered output is cached, and informs the render manager.

So, for example, if a prepare to render message is sent to a motion tracker specifying image 5, it might respond to say it requires a rendered output (by itself) for image 4. The render manager then sends a prepare to render message to the motion tracker for image 4, and the motion tracker responds to indicate that it requires image 3 and so on. In this way a list of render jobs which are needed before the required image (image 5) can be rendered is built up. Rendered outputs which are held in the cache are not included on the render manager's job list.

The same thing happens where an effect requires the rendered output of a preceding effect, and so on down a chain of effects.

At the end of this process, the render manager sets all of the required jobs going, in a reverse order so that the currently required image is not rendered until all of its dependent images are rendered.

As an optimisation, the render manager can detect from the graph what the inputs to each effect are. So, the effects server can send a predetermined code (e.g. a null reply) to say simply "all of the inputs to this effect are required".

As a further extension, the same protocol can be used so that each effects server can notify the render manager if its output is the same between adjacent images. A simple example of this is a (fixed) parameter plug-in, where the output is invariant. A further example is any other effect where the outputs have already been prepared and cached, so that a straightforward detection can be made as to whether successive outputs are identical. In response to such a notification, the render manager pass the information on to an effects server which is later in the directed acyclic graph. That effects server can then (if appropriate) render only one of a range of images and repeat that output for other images where its input remains the same.

Figure 6:
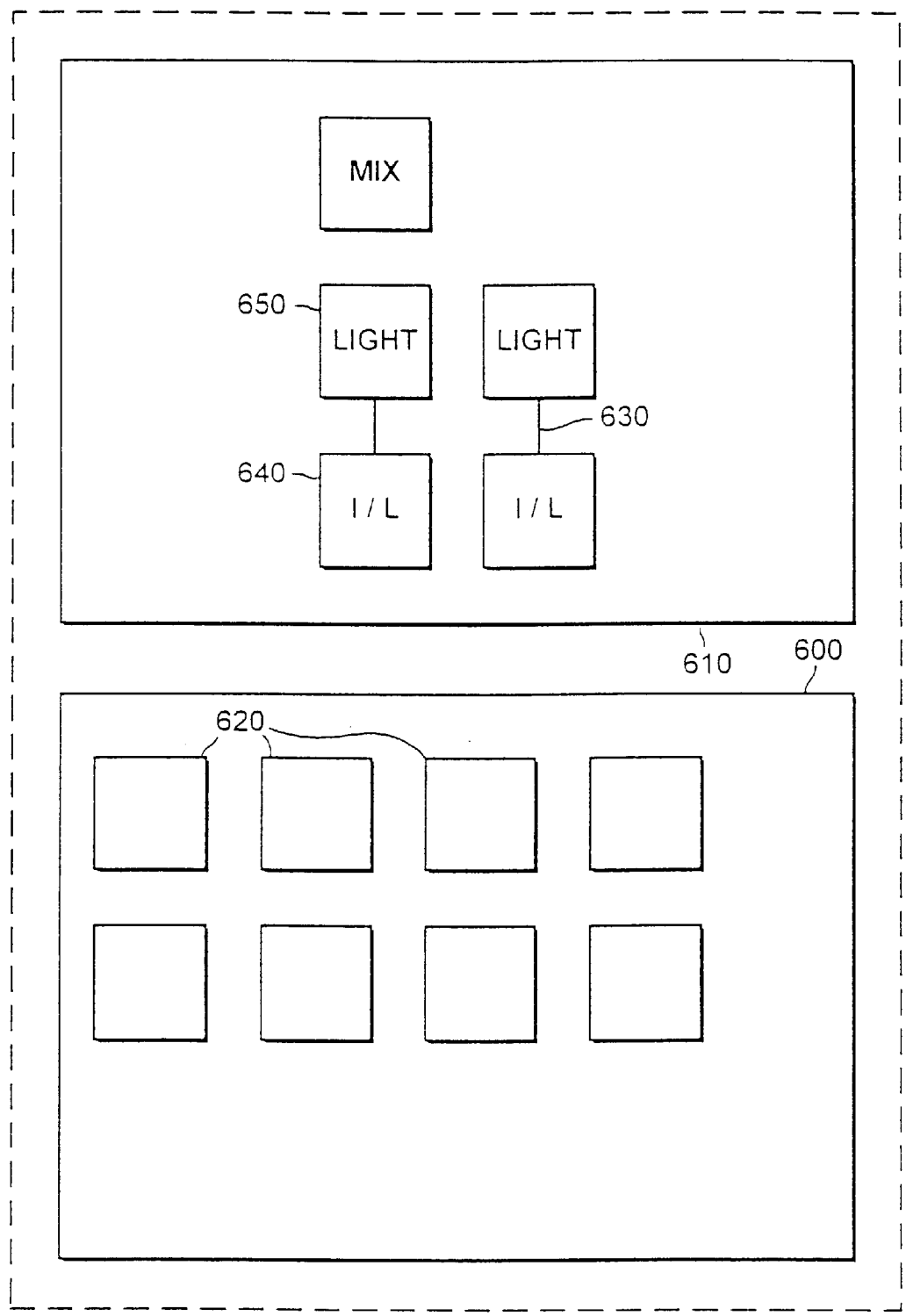
FIG. 6 schematically illustrates a graph editor window and a palette window.

FIG. 6 schematically illustrates a graph editor window 600 and a palette window 610. These are displayed on the display screen 160 under the control of the core 340.

The palette window 600 contains a number of icons 620, each mapped to and representing a different possible effect for which plug-ins exist on the system. Using a mouse control, the user can "drag" these icons into a scrollable graph window 610. The icons are arranged by the user in the graph window with respect to one another and can then be linked up with logical links 630, shown in the window as graphical lines.

The links 630 represent a passing of the output of an effect to the input of a subsequent effect, and (in this embodiment) always have a direction from the bottom of the graph towards the top of the graph window. So, the example shown in FIG. 6 has an image loader icon 640 passing its output to a lighting effect 650.

As the user sets up graphical links in the graph window, the core 340 sets up logical links to determine the way in which rendered output is passed from one effect plug-in to another.

The way in which the graphical links are created will now be described with reference to FIG. 7. The logical links will then be described with reference to FIG. 9.

Figure 7:
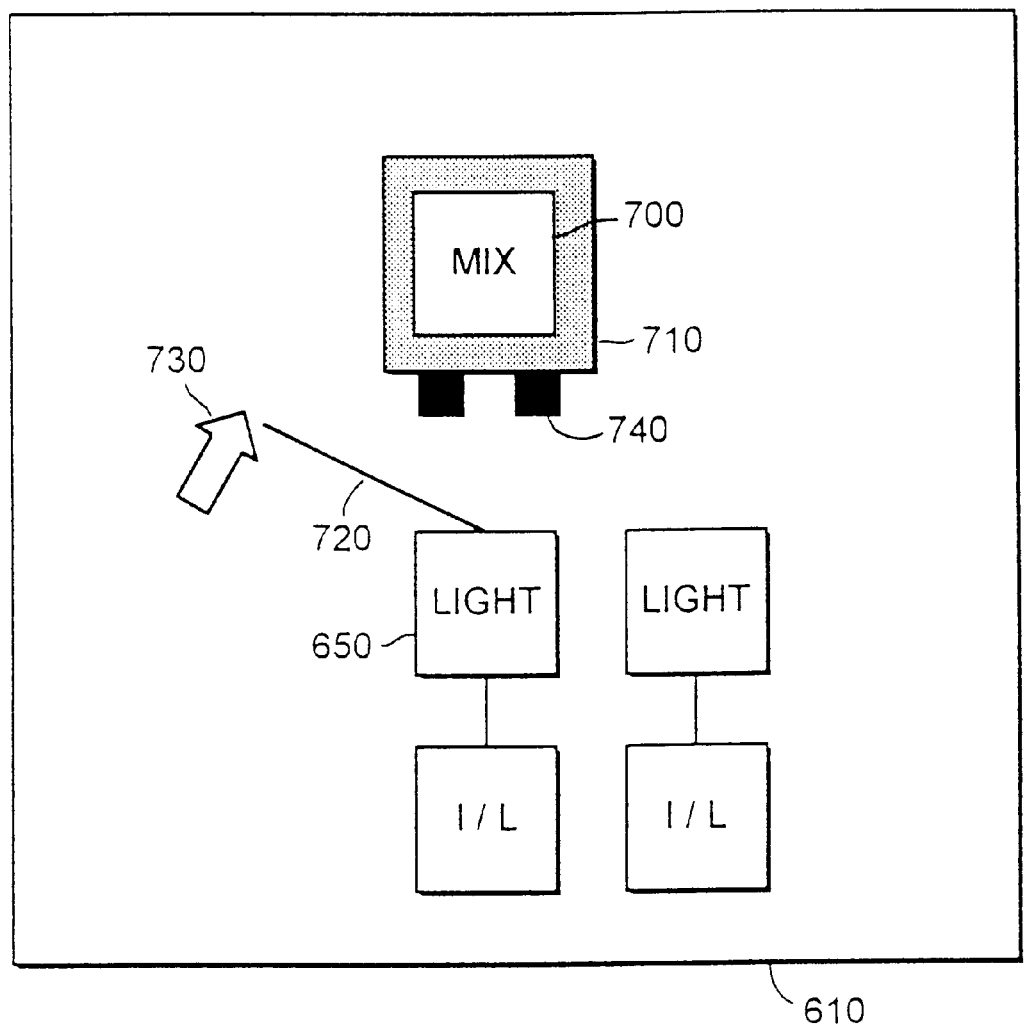
FIG. 7 schematically illustrates a graph editing operation.
Figure 8:
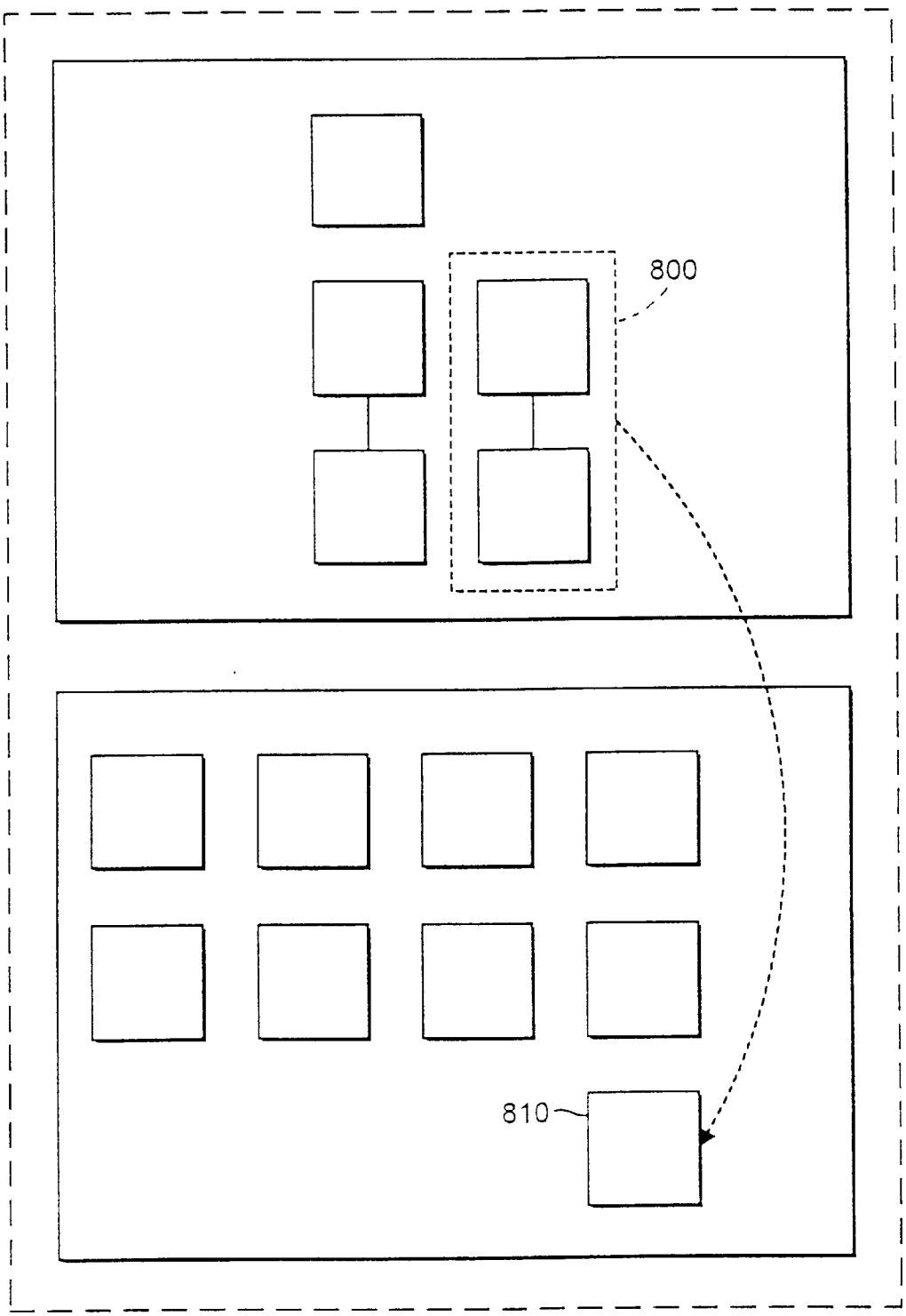
FIG. 8 schematically illustrates the creation of a composite effect icon.

In FIG. 7, the user has selected (e.g. with a mouse click) the lighting effect and now has a moveable graphical line 720 directed from the icon 650 towards a mouse pointer 730. As the mouse pointer approaches a mixing effect icon 700, the mixing effect icon is magnified, or surrounded by an enlarged 710, showing two input ports at the bottom of the border 740. As the mouse pointer approaches one of the input ports, the graphical line 720 snaps onto that input point and can be fixed in place with a mouse click. This establishes a logical and graphical connection between the effect 650 and the effect 700.

Once these logical and graphical connections are established, the user can "box" a linked group 800 of the effects icon in the graph window. Here, to "box" means to draw a box around the group in a standard way using a computer mouse. (One way that this is implemented is to click and hold at the top left hand corner of the box, drag the mouse to the bottom right hand corner and then release the mouse button. It is a standard way of selecting or choosing plural screen objects).

The user is then able to drag the linked group of effects into the palette area. This creates a new, composite, effect icon 810 having a set of inputs formed from the inputs to the group and a set of outputs formed from the outputs of the group. In logical terms, instead of the effect icon 810 being mapped to a particular plug-in, it is mapped to a linked group of plug-ins interconnected in a particular way.

The composite effect icon 810 then forms part of the palette for use by the user in designing a graph. Later, if the user wishes to make use of the composite icon 810, he simply drags it into place on the graph window. Preferably, the effect icon 810 remains as a single icon on the graph window, but in other implementations it can expand out into the original group 800. As a further alternative, it can be displayed in its compressed form as a single icon, but with an "expand" button displayed so that the user can click on the expand button to display the original group of icons 800. In any event, the composite effect provided by the icon 810 is a copy of the original group 800.

Figure 9:
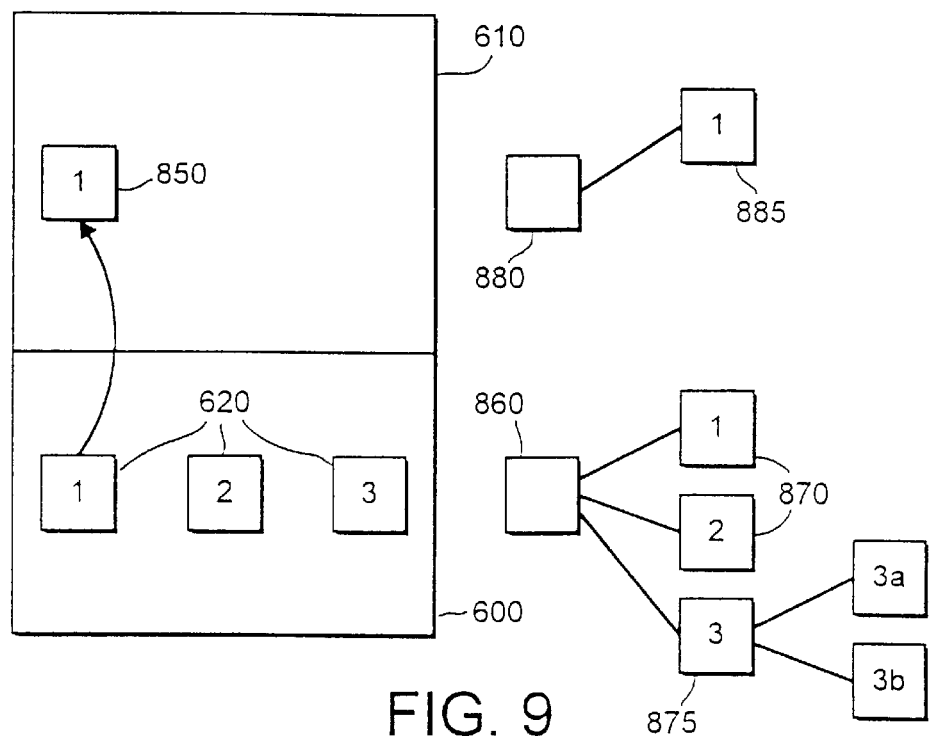
FIG. 9 schematically illustrates the file structure of a composite effect.

FIG. 9 illustrates the data storage underlying this process. In FIG. 9 an icon 850 has been dragged from the palette icons 620 in the palette area 600 into the graph editor area 610.

Associated with the palette area 600, and stored in the palette 356 shown in FIG. 3, is a data structure arranged as a tree having a root 860 and individual data items 870 depending from that root. Each data item 870 represents one effects icon 620, except in the case of a composite effect such as an effect 875. Here, the effects icons (3*a*, 3*b*) forming that effect are arranged in a sub-structure depending from that data item 875.

A similar data structure exists to store effects in the graph editor area. Here, a root 880 is shown having just one effect 885 depending from it. If a number of effects are grouped together in the graph editor area and dragged to the palette, they form a further composite effect structure similar to the structure 875.

Figure 10:
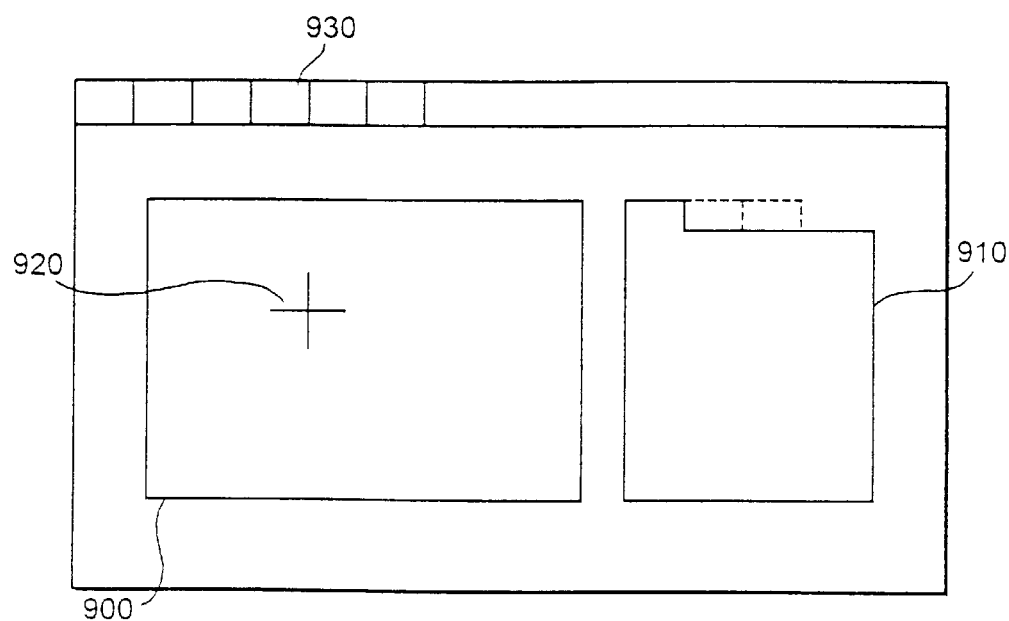
FIG. 10 schematically illustrates a viewer window.

FIG. 10 schematically illustrates a viewer window. The viewer window comprises an image display area 900, various "property pages" 910, and effects control 920 (here shown as a positioning cross-wire in the example of a lighting effect), and a "button bar" 930.

The basic layout of the viewer window is set by the core framework, and is standard from effect to effect. However, the particular items which can be adjusted using the property pages 910 are set by the effect UI 320 corresponding to a particular effect. The effect UI also provides display details for the control 920.

So, in the examples shown, the cross-wire 920 determines the source or target position of the light in the lighting effect. The user can drag the cross-wire using a computer mouse. Dragging the cross-wire changes the parameter (x,y) values associated with that control, and so the procedure of FIG. 4 (update parameter values) is initiated. As the last part of that procedure, in the step 408, the effect UI issues the corrected parameter value to the viewer window. At the stage, the cross-wire is re-drawn in its new position. So, although it appears to the user that the dragging action has moved the cross-wire to its ultimate position, in fact the dragging action created a parameter update which, by the route shown in FIG. 4, resulted in the movement of the cross-wire.

Figure 11:
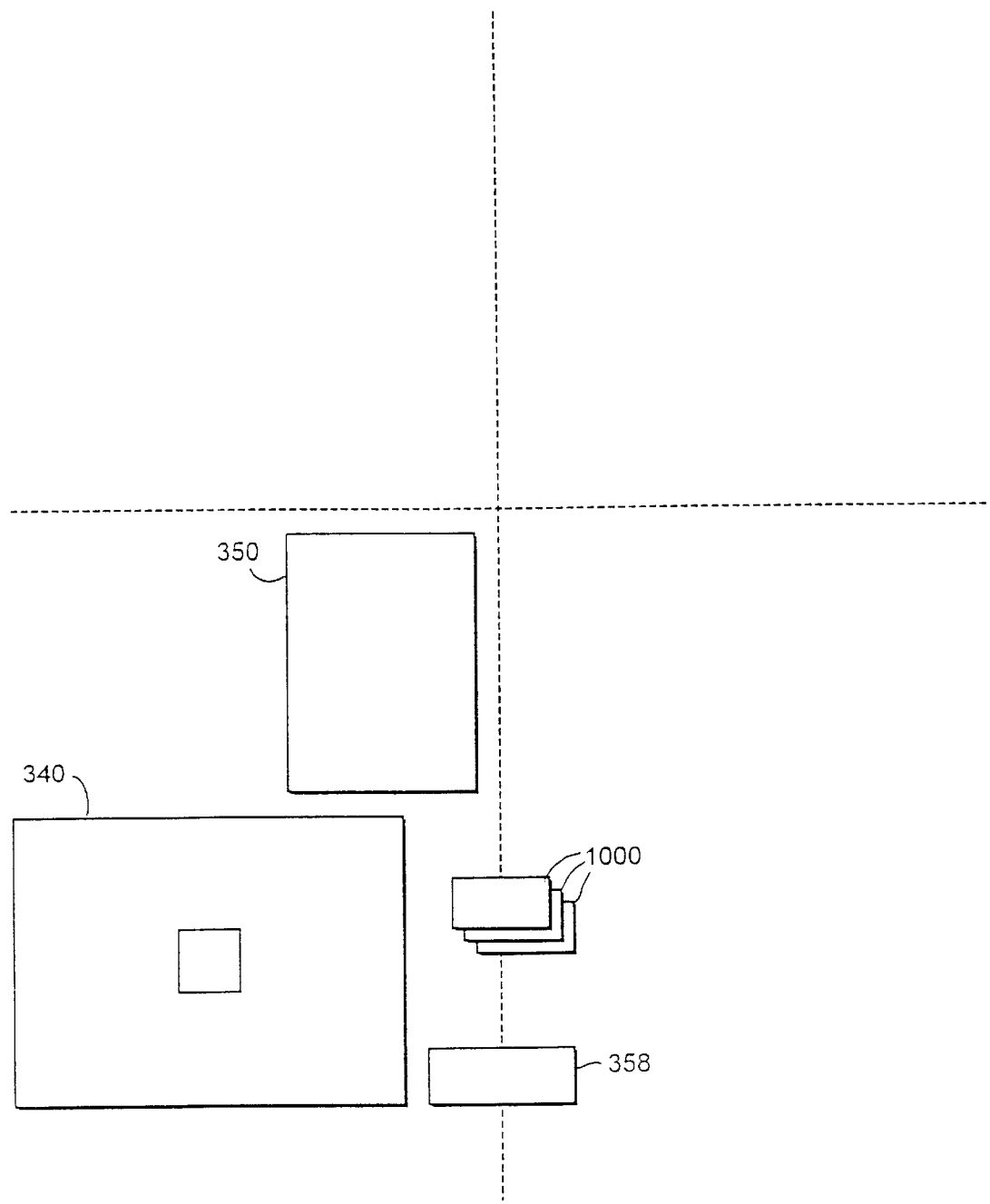
FIG. 11 schematically illustrates an initial arrangement of the operating software.

FIG. 11 schematically illustrates an initial arrangement of the operating software. This presents the situation before any rendering has to be carried out in a particular operating session of the apparatus.

The plug-ins are implemented under the Windows operating system as "dynamic load libraries" (DLLs). DLLs are generally large files which can contain program code, data and subroutine libraries. Conventionally, to conserve memory and improve system performance, a DLL loaded into memory when first needed for execution or initiation of a particular process handled by that DLL. In the present embodiment, this idea of conserving memory and improving system performance is taken one step further.

So, when an effect icon is first taken from the palette area, conventionally the DLL corresponding to that effect would be loaded into memory to provide the core 340 with sufficient information (e.g. interconnectivity with other effects icons) for the graph to be built.

In the present embodiment, the DLL for that effect is not loaded at that stage. Instead, so called "metadata" 1000 representing that effect is loaded. The metadata provides the core with information defining the interconnectivity of the effect with other effects (e.g. number of inputs and outputs). This enables the core to build up a graph without the need to load any DLLs, so saving memory by not loading large files until they are absolutely needed.

If a viewer window is opened relating to an effect, or if the composite effect is executed by any other means, then the DLLs are loaded and the metadata discarded or ignored.

Figure 12:
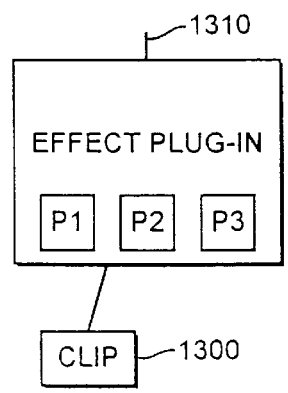
Figure 13:
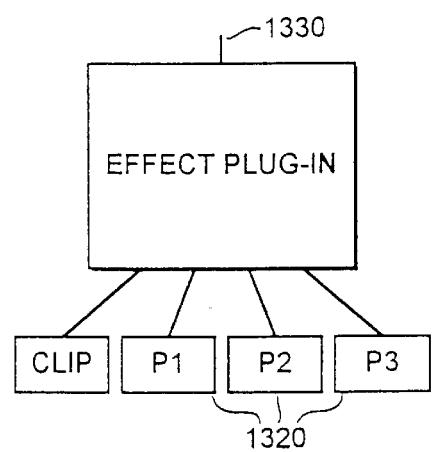
Figure 14:
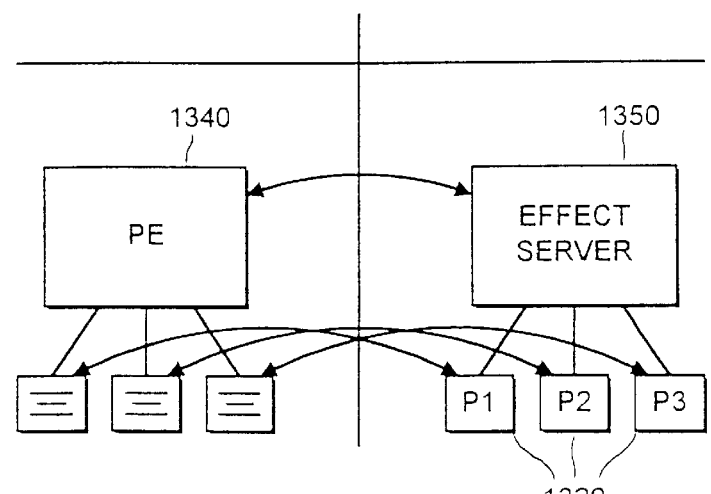
FIG. 14 schematically illustrates the relationship between the effects servers and proxy effects for the effects plug-in of FIG. 13.

FIGS. 12 to 14 schematically illustrate features of the effects plug-ins which (amongst other things) facilitate automation of the system.

FIG. 12 schematically illustrates a previously proposed effects plug-in. This effect takes image information (shown as a "clip" 1300) and acts on the basis of three processing parameters P1, P2 and P3 (such as lighting positions etc.). In the plug-in of FIG. 12, the parameter values are set within the plug-in, i.e. by bespoke program code written as part of the plug-in. This makes overall control of the parameters—e.g. for an animation system where the parameters vary with time, or in an arrangement where a parameter such as a lighting position is varied by another effect such as a motion tracker—very difficult, requiring additional code within the effects plug-in and often multiple versions of the effects plug-in.

FIG. 13 schematically illustrates another approach according to an embodiment of the invention. Here, each parameter is defined by a separate plug-in 1320, linked to the "main" effects plug-in 1330 in the same way as the links between effects are defined in the graph editor described above. In fact, the description given above was a simplification of the whole process, the simplification being made at that stage to assist in the explanation.

The parameter plug-ins are normally hidden from the user, for example by displaying them at screen positions in the graph editor and palette which are "off the page".

So, if an effect is to be operated in a self-contained, non-animated manner (i.e. without importing parameter values from other effects), then parameters are set for each parameter plug-in 1320 using the main effect's viewer window.

If a parameter is to be defined by another effect's output, e.g. a position value being provided by a motion tracking effect, then all that is required if for the logical link between the main effect plug-in 1330 and the appropriate parameter plug-in 1320 to be severed and a link to the motion tracking effect initiated.

In order to understand how this system can assist in animation, reference is made to FIG. 14.

FIG. 14 shows the left-right split between core and plug-in shown first in FIG. 3. On the left hand side of FIG. 14, a proxy effect (PE) 1340 is provided for the "main" effect server 1350. Proxy effects 1360 are also provided for each of the parameter plug-ins 1320. These proxy effects 1360 are of a much simpler nature than the proxy effect 1340, and communication between the proxy effects 1360 and the parameter plug-ins 1320 uses a simplified subset of the communication protocol between the proxy effect 1340 and the effects server 1350.

In actual fact, the proxy effects 1360 can be a single data value (in a non-animated system) or a list of values in an animated system. In an animated system, the list of values can be expressed as "key frame" values, i.e. data values set for particular images in a sequence, with intervening values being interpolated by the core according to a linear or user-defined non-linear interpolation. So, animation can be set up in a particularly simple and convenient way without having to write bespoke animation software within each plug-in.

Relating this description to that given earlier about dependencies between effects, when a "prepare to render" message from the render manager is received by an effects server 1350, it can respond to say that it requires all of its inputs before that output can be provided. Included in the effect's inputs are of course the parameter plug-ins, so the next stage would be for the render manager to send a prepare to render message to each parameter plug-in. If the parameter plug-in contains a single value, or if the current image is a key frame, then the parameter plug-in is ready to provide the appropriate parameter at render time. If, however, the parameter plug-in contains animation data and the current image is not a key-frame, the parameter must first be interpolated before it can be used in the effect.

Figure 15:
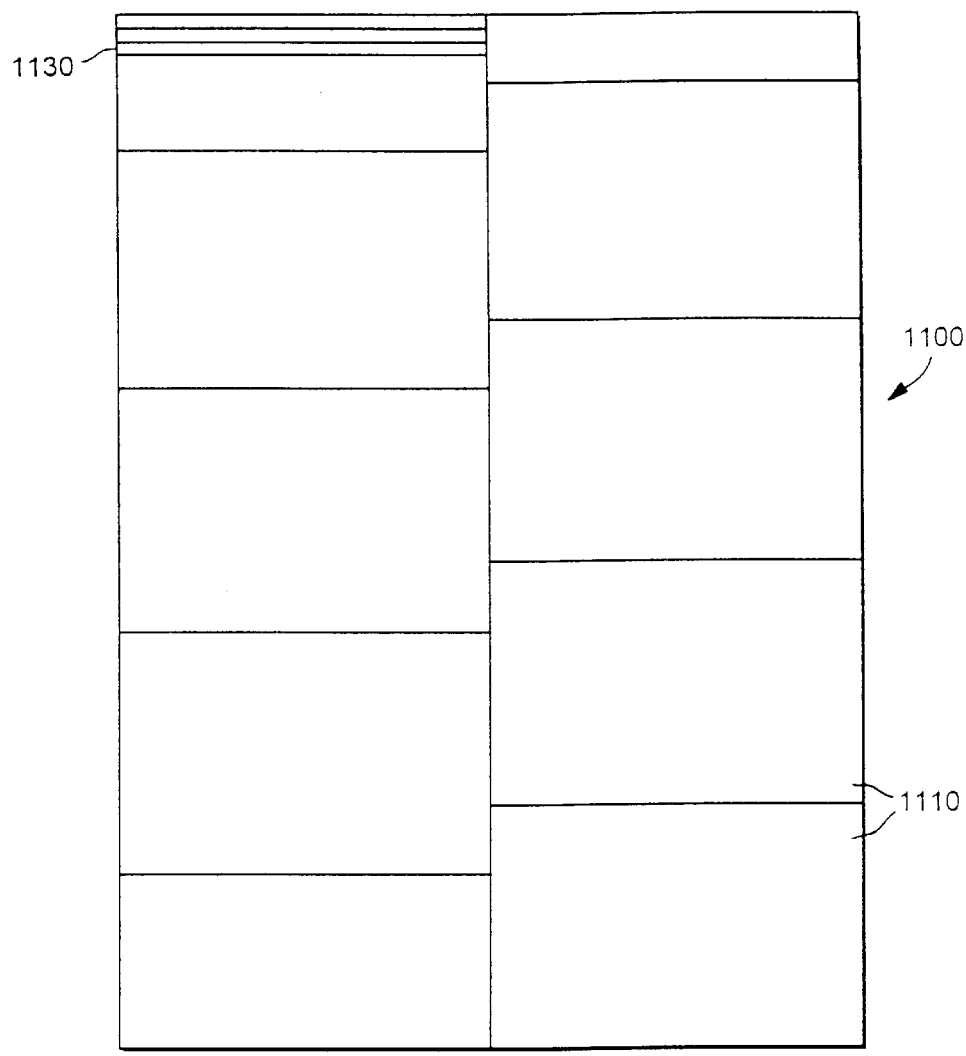
FIG. 15 schematically illustrates a system cache.

FIG. 15 schematically illustrates a system cache 1100. This is a schematic view of the whole cache area—in fact, as described earlier, the cache can also be viewed as plural individual caches associated with respective proxy effects, but since memory resources are dynamically allocated between such individual caches the representation of FIG. 15 is also a valid one.

The cache is provided in the system memory 150 and is able to store images 1110 and non-image rendered outputs 1130 from effects (e.g. a motion vector in the case of a motion tracking effect).

The idea of the cache is to store the rendered output (whether or not this is an image) of each effect in the directed acyclic graph. In this way, if an effect is altered at a particular position in the directed acyclic graph, effects below that position do not need to be re-rendered to provide the new output. Instead, the cached outputs can be re-used. A further benefit is to assist in and speed up undo/redo operations, by storing the output of particular effects (those with open viewer windows) before and after a parameter change is made. The corresponding parameter change is also stored, so that the parameter change can be undone or redone simply by loading the appropriate material from the cache memory 1100. This is under the control of the undo/redo objects written by the effects serves when a change is made.

Images take up very much more memory space than a simple data value like a motion vector—perhaps a million times as much memory space. So, in this embodiment, when the cache memory approaches its capacity and another image is to be stored, the least recently accessed image in the cache is deleted to make room for the newly stored image. However, other data in the cache—parameter values, non-image rendered outputs and so on—is not deleted during an operating session of the apparatus because it consumes such a tiny amount of memory space in comparison with an image. This information is then available for re-use, or for undo/redo operation, as long as the information remains valid throughout an operating session.

In practice, it can be left that the plug-in specifies whether a data item is flushable or not, with image data items being set by convention as flushable, and non-image items being set as non-flushable.

Figure 16:
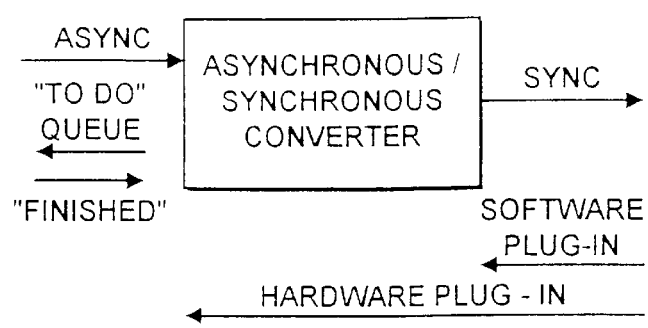
FIG. 16 schematically illustrates a plug-in interface.

FIG. 16 schematically illustrates an asynchronous-synchronous converted 1200 between the core 340 and an effect server.

The converter 1200 receives asynchronous re-rendering commands from the render manager in the form of a "To do" queue, i.e. a list of rendering jobs to be done. When a job is finished, a "finished" message is returned from the converter 1200 to the render manager.

The converter 1200 receives the asynchronous job requests and issues synchronous requests to the appropriate software plug-in. This means that the interface 1200 passes a control "thread" (a Windows term) to the software plug-in, which retains control of the thread until the job is complete. Only then, the software plug-in returns the thread to the interface, which responds by issuing the "finished" message to the core.

At initialisation, the core interrogates each plug-in (or rather the metadata associated with that plug-in) to determine whether the plug-in can handle synchronous or asynchronous communication. If a hardware plug-in (e.g. a peripheral card for rendering in a particular way) or an asynchronous software plug-in, possibly running on a different machine, is installed in place of a software plug-in, that plug-in interacts with the core (in fact the render manager which initiates rendering tasks asynchronously) via the asynchronous interface, as hardware accelerators are much better suited to operation in this way. So, in this case, the converter 1200 is bypassed.

The converter may be implemented as part of the core or part of each relevant plug-in.

Accordingly, by the counter-intuitive step of providing a converter 1200 between two pieces of software, an efficient hardware interface is provided for a later upgrade to dedicated hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Digital video processing apparatus comprising:

a plurality of render processors arranged in a directed acyclic graph, each operable to render an output result relating to an image of a video signal from input data relating to one or more of said image and other images received from a preceding render processor in said directed acyclic graph; and a render controller for controlling rendering operation of said render processors;

each render processor being operable to communicate dependency data to said render controller, indicating which images must be rendered by a preceding render processor in order for that render processor to render output data relating to a required image; and said render controller being operable to control operation of said render processors so that images required by each render processor are rendered by preceding render processors in said directed acyclic graph;

whereby said apparatus is controlled through software including core software and one or more plug-ins, each plug-in being associated with an effect that can be applied to one or more of said image and other images;

whereby said core software includes an object manager, a render manager, a change manager and a graph, said graph corresponding to a linked series of individual special effects, and each of said individual effects being represented as a proxy effect having an associated cache; and whereby when a user of the apparatus indicates via a viewer window the changing of one of said effects an undo/redo object is written into the core software and in response to receipt of said undo/redo object said core software broadcasts to all viewer windows an indication that a parameter has changed.

2. Apparatus according to claim 1, in which, where a render processor is linked, in said directed acyclic graph, to one or more other render processors, that render processor is operable to return a predetermined response to said render controller, common between render processors, if that render processor requires only a render output relating to a current image from said linked render processor(s).

* * * * *